United States Patent [19]

Latvala

[11] Patent Number: 5,340,212
[45] Date of Patent: Aug. 23, 1994

[54] PROPORTIONING RELAY VALVE DISABLED BY FAILED FRONT BRAKING CIRCUIT

[75] Inventor: Bruce E. Latvala, Grafton, Ohio

[73] Assignee: Allied-Signal Inc., Morristown, N.J.

[21] Appl. No.: 36,586

[22] Filed: Mar. 24, 1993

[51] Int. Cl.$^5$ .............................................. B60T 11/12
[52] U.S. Cl. ........................................ 303/7; 188/349; 303/9.63; 303/9.66; 303/9.71; 303/9.75; 303/40
[58] Field of Search .............. 303/9.63, 9.66, 9.71, 303/9.75, 7-9, 13, 50, 9.62, 9.69, 54, 9.72, 9.73, 9.74, 9.76, 71, 28-30, 40; 188/3 R, 3 H, 112 R, 349; 137/627.5

[56] References Cited

U.S. PATENT DOCUMENTS

| | | | |
|---|---|---|---|
| 3,190,700 | 6/1965 | Fites | 303/7 |
| 3,259,439 | 7/1966 | Bueler | 303/9.71 |
| 4,050,746 | 9/1977 | Durling | 303/40 |
| 4,230,373 | 10/1980 | Plantan | 303/9.72 |
| 4,368,926 | 1/1983 | Bartholomew | 303/9.66 |
| 4,383,717 | 5/1983 | Bueler | 303/40 |
| 4,410,218 | 10/1983 | Bueler | 303/9.66 |
| 4,455,052 | 6/1984 | Beuler | 303/40 |
| 4,553,789 | 11/1985 | Pugh et al. | 303/54 |
| 4,571,007 | 2/1986 | Carmichael et al. | 303/40 |
| 4,725,101 | 2/1988 | Szudy et al. | |
| 4,758,051 | 7/1988 | Szudy et al. | 303/9.72 |
| 4,850,651 | 7/1989 | Latvala | |

*Primary Examiner*—Douglas C. Butler
*Attorney, Agent, or Firm*—Ken C. Decker

[57] ABSTRACT

A fluid pressure braking system for a tractor-trailer combination vehicle includes a proportioning relay valve which controls communication to the rear wheel brakes of the tractor. When the tractor pulls a trailer, the proportioning control within the relay valve is disabled, but when the vehicle is operated in the "bobtail" mode without pulling a trailer a proportioned brake application is effected in which the braking pressure communicated to the rear brake actuator is a predetermined percentage of that in the front wheel braking circuit. The proportioning mechanism is also disabled when the front axle braking circuit malfunctions, so that upon loss of pressure of the front axle system, the driver effects a non-proportioned rear brake application.

16 Claims, 5 Drawing Sheets

PROPORTIONING RELAY VALVE DISABLED BY FAILED FRONT BRAKING CIRCUIT

This application relates to a proportioning control valve for a fluid pressure braking system.

Heavy duty vehicles are normally equipped with fluid pressure operated brakes. These heavy vehicles normally include a tractor pulling a loaded trailer. The tractor braking system includes front and rear braking circuits, and the trailer braking system is controlled by fluid pressure communicated through a pair of pressure lines interconnecting the tractor and the trailer. The trailer supply line supplies fluid pressure to the trailer for charging the reservoirs thereof and controls the trailer parking brakes; the trailer control line supplies brake control signals to the trailer brake service actuation system when the service brakes of the tractor are actuated.

The tractor braking system is equipped with front and rear braking circuits. Braking is effected in the front and rear braking circuits simultaneously by operation of a dual brake valve mounted in the vehicle operator's compartment. Since the tractor normally pulls a loaded trailer, the brakes comprising the rear wheel braking circuit of the tractor must be sized to effectively brake the tractor pulling a fully loaded trailer. This causes dangerous overbraking on the rear wheels of the tractor when the tractor is operated in the so-called "bobtail" mode; that is, without pulling a trailer. Accordingly, it has been proposed in U.S. Pat. Nos. 4,850,651 and 4,725,101 to actuate the rear wheel brakes of the tractor by a so-called proportioning relay valve. This relay valve includes a proportioning mechanism which is connected to the trailer supply line through a control port. During normal operation of the vehicle in which the tractor pulls the trailer, the proportioning mechanism is disabled by pressure at the control port, so that the proportioning relay valve functions as any normal relay valve. However, when the tractor is operated in the bobtail mode in which the supply line is vented, a proportioning mechanism within the proportioning relay valve becomes effective to proportion rear brake pressure to a predetermined fraction of the pressure level in the front wheel circuit.

While it is normally desirable to proportion rear brake pressure to a predetermined fraction of the front brake pressure when the tractor is operated in the bobtail mode, it is not desirable to proportion rear brake pressure to a predetermined fraction of the front brake pressure when the tractor is operated in the bobtail mode and a failure of the front circuit of the tractor braking system occurs. Improved braking with fixed ratio brake proportioning as herein described is the result of greater use of available front brake capability prior to lockup of the rear wheels. The proportioning valve reduces rear brake pressure to permit the driver to apply a higher level of front wheel braking without rear wheel lockup. A failure in the front brake circuit precludes improvement due to increased front braking, but the driver is still required to modulate at the higher level of the brake graduating range which makes brake control more difficult. By eliminating proportioning during a failure in the front braking circuit, the driver is able to more quickly modulate the rear wheel brakes to the point of wheel lock and more quickly release the brakes from a locked condition. Accordingly, the present invention disables the proportioning mechanism in the proportioning relay valve disclosed in the above-identified United States patents during a failure in the front braking circuit, while retaining normal proportioning when both the front and rear braking circuits are intact.

These and other advantages of the present invention will become apparent from the following description with reference to the accompanying drawings, in which.

Figure 1:
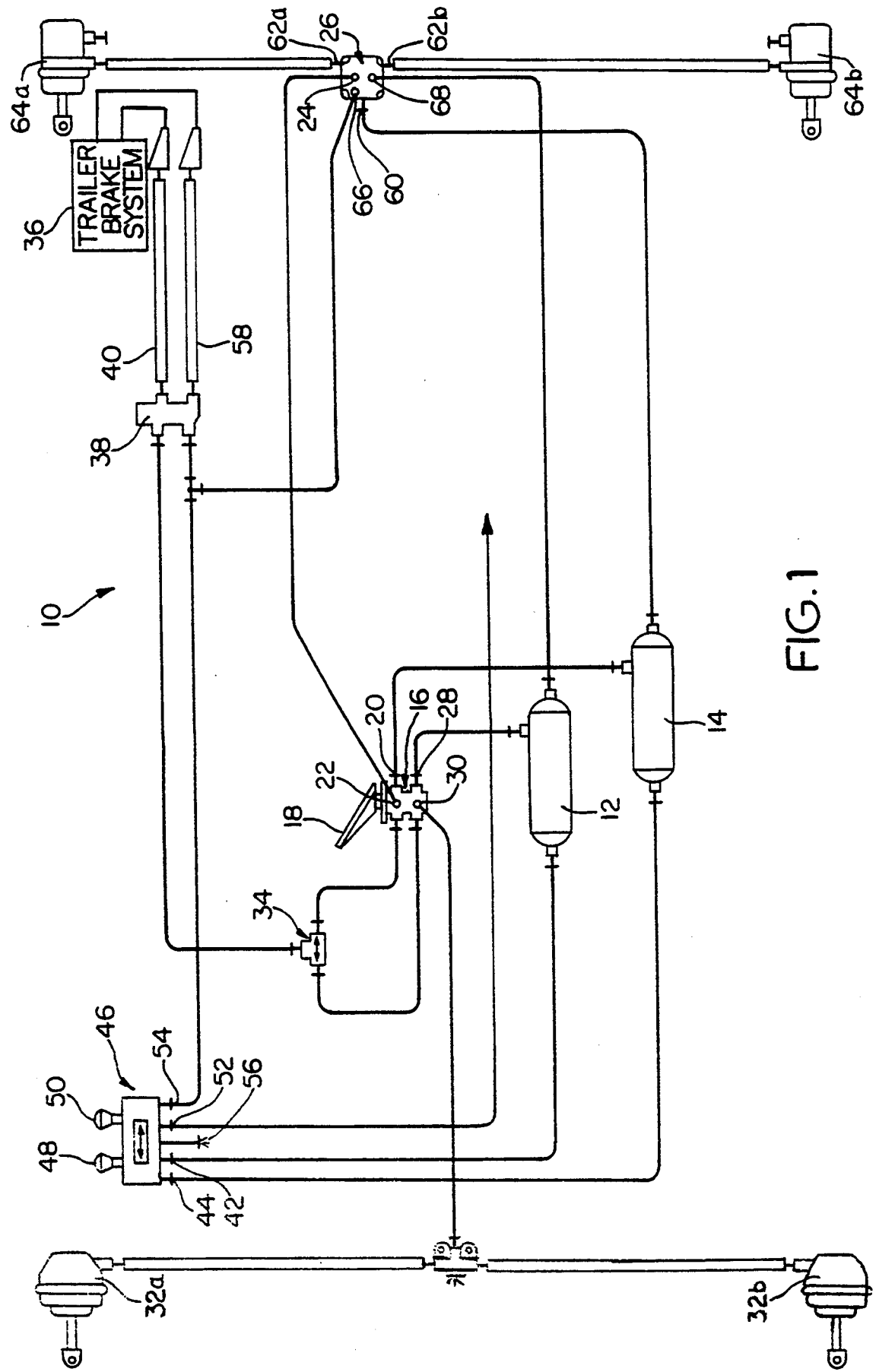
FIG. 1 is a schematic illustration of a fluid pressure braking system made pursuant to the present invention.

Referring now to FIG. 1 of the drawings, a tractor braking system generally indicated by the numeral 10 includes a front service brake reservoir 12 and a rear service reservoir 14, both of which are charged with compressed air by a conventional automotive air compressor (not shown). A standard dual brake valve 16 is operated by a treadle 18 in the vehicle operators' compartment. The brake valve 16 includes an inlet port 20 communicated to the rear reservoir 14 and a corresponding outlet port 22 which is communicated with service port 24 of a proportioning relay valve generally indicated by the numeral 26 which will be described in detail hereinafter. Dual brake valve 16 further includes an inlet port 28 which is connected to the front service reservoir 12, and a corresponding outlet port 30 which is connected to front brake actuators 32a, 32b. The outlet ports 22, 30 are also communicated through a double check valve 34, which selects the higher of the fluid pressure levels at the outlet ports 22, 30 for communication to trailer braking system 36 through a tractor protection valve 38 of conventional design and trailer service or control line 40.

The front and rear service reservoirs 12, 14 are also connected to corresponding inlet ports 42, 44 of a conventional push/pull parking brake control valve generally indicated by the numeral 46. Separate knobs or buttons 48, 50 are adapted to control communication between the inlets 42, 44 and outlets 52, 54 and between the outlets 52, 54 and an exhaust 56. Outlet 54 is also connected through the tractor protection valve 38 to trailer supply line 58. The trailer supply line 58 is also connected to the trailer braking system 36 and is charged with fluid pressure when the tractor braking system 10 is connected to the trailer braking system 36, but is vented when the tractor and trailer braking systems are disconnected, such as when the tractor is operated in the "bobtail" mode. The outlet port 52 is connected to the tractor rear parking brakes which are a part of tandem rear actuators 64a, 64b. Accordingly, operation of knob 48 controls communication to the tractor rear parking brakes through outlet port 52 and the knob 50 controls the communication of supply pressure to the trailer brakes through outlet port 54 and trailer supply line 58.

Rear service reservoir 14 is also connected to supply port 60 of the proportioning relay valve 26. Proportioning valve 26 further includes delivery ports 62a, 62b, which are connected directly to the service section of the conventional tandem brake actuators 64a, 64b. Proportioning relay valve 26 further includes a control port 66 which is communicated directly with supply line 58. Accordingly, port 66 will be vented when the tractor is operated without the trailer in the "bobtail" mode, and will be pressurized when the tractor is pulling a trailer. The front service reservoir 12 is communicated with front reservoir port 68 of proportioning relay valve 26.

Figure 2:
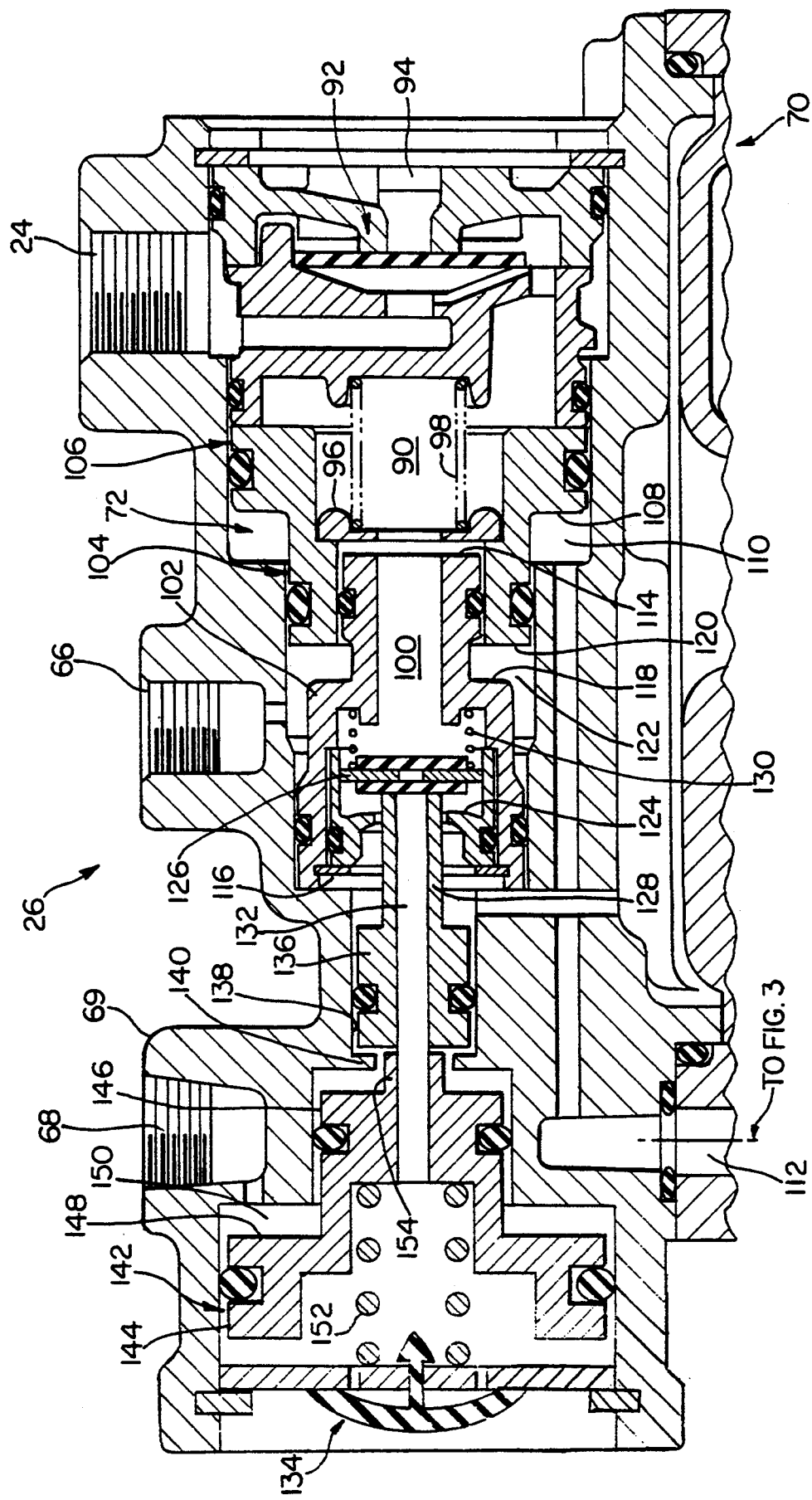
FIG. 2 is an enlarged cross-sectional view of the upper portion of a proportioning relay valve used in the system illustrated in FIG. 1.
Figure 3:
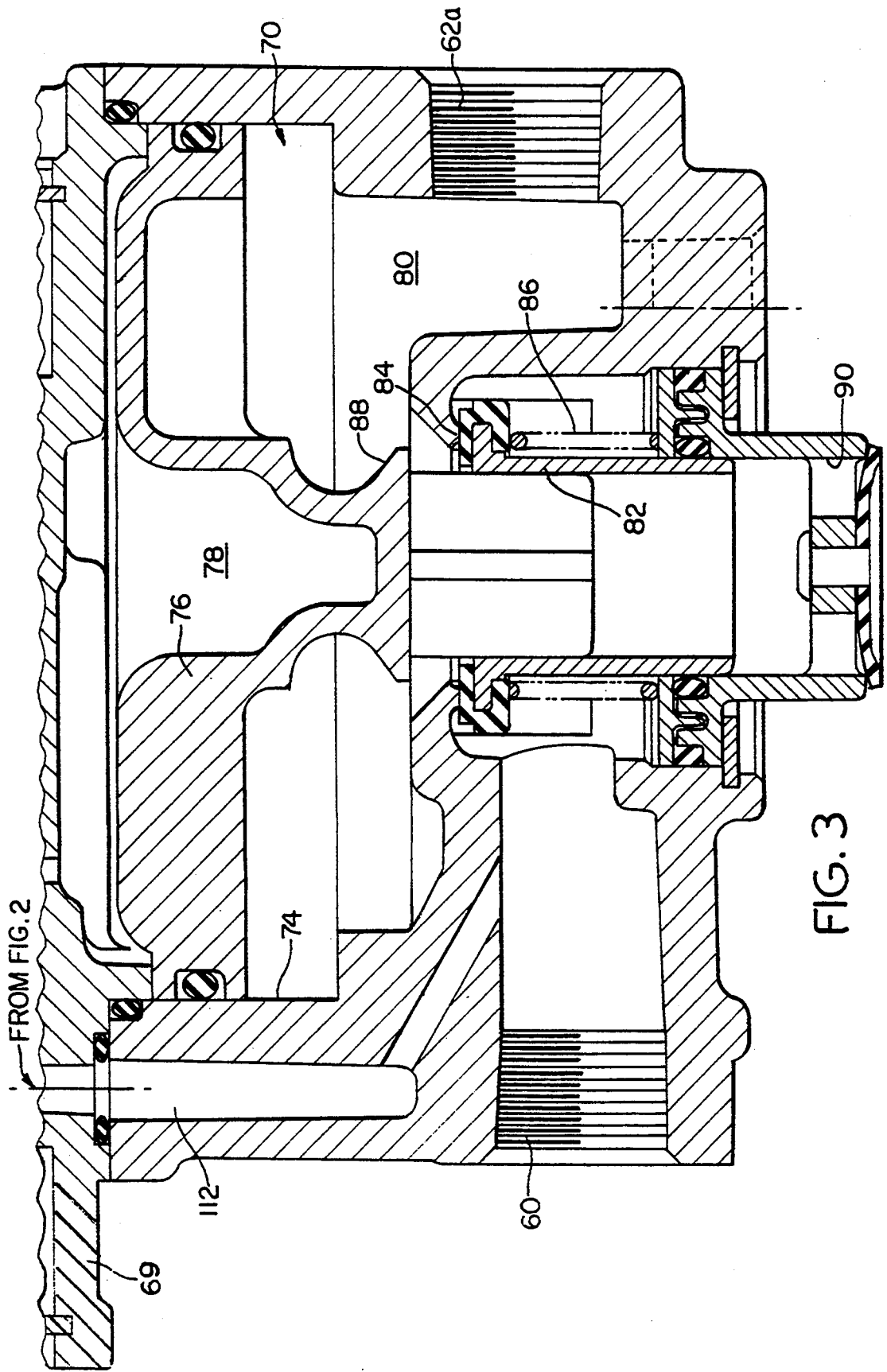
FIG. 3 is an enlarged cross-sectional view of the mating lower portion of the proportioning relay valve of FIG. 2.

Referring now to FIGS. 2 and 3, the proportioning valve 26 includes a housing 69 having a relay section generally indicated by the numeral 70 and a proportioning control section generally indicated by the numeral 72. Relay section 70 includes a bore 74 which slidably receives a conventional relay piston 76, which divides the bore 74 into sections 78, 80 on opposite sides of the relay piston 76. Section 80 is communicated to the service ports of tandem actuators 64a, 64b through corresponding outlet ports 62a and 62b (not shown on FIG. 3). The relay section 70 further includes a poppet member 82 slidably mounted within the housing 69 and which is urged into sealing engagement with a circumferentially extending exhaust valve seat 84 by a spring 86. The relay piston 76 further carries a circumferentially extending valve seating area 88 which is adapted to engage the poppet member 82 to control communication between section 80 and exhaust port 90. Upon downward movement of the relay piston 76, viewing FIG. 3, the valve seating area 88 engages the poppet member 82 to thereby close off communication between the section 80 and exhaust port 90, and further downward movement cracks open the poppet member 82 from the exhaust valve seat 84 to permit communication between supply port 60 and section 80. The relay piston 76, including valve seating area 88, cooperates with popper 82 and valve seating area 84 to establish a fluid pressure level at the outlet ports 62a, 62b corresponding to the pressure level in section 78, in a manner well known to those skilled in the art.

Section 78 is communicated to service port 24 through the proportioning section 72 by way of a flow path generally indicated by the numeral 90. Flow path 90 includes a section extending from service port 24 through a quick release valve generally indicated by the numeral 92. The quick release valve 92 is conventional, and vents the flow path 90 to atmosphere through passage 94 when the pressure level at the service port 24 drops. The flow path 90 extends through an aperture in a caging member 96 of a caged spring assembly generally indicated by the numeral 98, and then continues through a passage 100 defined in a primary portion 102 of a two-piece proportioning piston assembly generally indicated by the numeral 104. Assembly 104 further includes a secondary portion 106. Secondary portion 106 includes a shoulder 108 which cooperates with the housing 68 to define a chamber 110 therebetween. Chamber 110 is communicated to supply port 60 through passages generally indicated by the numeral 112.

Primary proportioning portion 102 includes a reduced diameter surface 114 which is received within the secondary proportioning portion 106, and further includes a fluid pressure responsive surface 116 on the end of the portion 102 opposite the end 114 and which is exposed to the fluid pressure level in the section 78. It will be noted that surface 116 is larger than surface 114. Primary proportioning portion 102 further includes a shoulder 118 which cooperates with a corresponding shoulder 120 on secondary portion 106 to define a chamber 122 therebetween. Chamber 122 is communicated with port 66. As discussed above, port 66 will be vented if the vehicle is being operated in the "bobtail" mode, but will be pressurized if the vehicle is pulling a trailer. The primary proportioning portion 102 carries a circumferentially extending, radially inwardly projecting valve seat 124 which engages a valve element 126 carried within the primary proportioning portion 102 and which is lightly loaded into sealing engagement with an exhaust valve member 128 by spring 130. Exhaust valve member 128 defines a passage 132 which communicates with atmosphere through exhaust valve 134. The exhaust valve member 128 is supported on a moveable member 136 which is slidably mounted in counterbored portion 138 and which is engagable with stop 140 on the housing 69. Under normal operation of the proportioning section 72, spring and pressure forces urge the movable member 136 into engagement with the stop 140. A disabling piston generally indicated by the numeral 142 is stepped to define a larger diameter portion 144 and a smaller diameter portion 146 with a shoulder 148 therebetween. Shoulder 148 cooperates with the housing 69 to define a cavity 150 therebetween. Cavity 150 is communicated with front axle reservoir port 68 which, as discussed hereinabove, is communicated with the front service reservoir 12. A spring 152 yieldably urges the piston 142 to the right, viewing FIG. 2, such that an extension 154 on the end of the disabling piston 142 extends through the stop 140 to engage the movable member 136. Accordingly, as will hereinafter be explained, during failure of the front service circuit the disabling piston 142 urges the movable member 136, and therefore the valve member 126, to the right, viewing FIG. 2.

In operation, when the tractor is being operated in the normal mode, the control port 66 is connected to the supply line 58 so that port 66, and therefore chamber 122, is pressurized, thereby holding the primary proportioning portion 102 in the position illustrated. In this condition, substantially uninhibited communication is permitted through the flow path 90 between the service port 24 and section 78 of the relay portion 70. Accordingly, when the vehicle operator effects a brake application by operation of treadle 18, the dual brake valve 16 communicates a pressure signal to this port 24 which is communicated into the section 78, thereby operating the relay piston 76 to close off communication between the delivery port 62a and the exhaust port 70, and initiate communication between the supply port 60 and the delivery port 62a.

As discussed above, when the tractor is operated in the "bobtail" mode without pulling the trailer, the supply line 58 is vented, thereby venting control port 66. Since the pressure level in chamber 122 is now vented, the primary proportioning portion 102 is now free to move within the housing 69. Accordingly, since chamber 122 is now vented, a differential effective area is created across the primary proportioning portion 102, with the effective area of portion 102 exposed to the pressure level at service port 24 being equal to the smaller effective area 114 and the effective area exposed to the pressure level in section 78 being equal to the larger effective area 116. Accordingly, as is well known in those skilled in the art, the proportioning portion 102 which carries the valve seat 124 cooperates with the valve element 126 to control communication to the section 78 such that a pressure ratio is created between the supply port 24 and the section 78 equal to the area ratio across the proportioning portion 102, again in a manner well known to those skilled in the art and as more fully discussed in the above-identified prior art U.S. Pat. Nos. 4,850,651 and 4,725,101. As also discussed in these patents, when the force of the fluid pressure at service port 24 acting on the secondary portioning portion 106 overcomes the force of fluid pressure from supply port 60 acting against shoulder 108, the secondary portion 106 is driven against the shoulder 118 so that the primary and secondary portions move together as a single piston. Since the area of portion 106 exposed to the fluid pressure at service port 24 now exceeds the area of the downstream end 116 of primary proportioning portion 102, the pressure in section 78 increases more rapidly than the pressure at service port 24, until the pressures at the service port 24 and in the section 78 are equalized. This is the so-called "blend-back" feature discussed in the aforementioned patents, and as discussed in them the pressure at which this blend-back feature comes into play is made a function of the pressure level at the supply port 60, since this port is communicated to the chamber 110 through the passages 112.

Although it is normally desirable to proportion communication between the service port 24 and section 78 to thereby create a differential pressure when the tractor is operated in the "bobtail" mode, it is not desirable to proportion communication when a failure occurs in the front wheel braking circuit including the front axle reservoir 12, for the reasons discussed above. Accordingly, when the pressure level in front service reservoir 12 drops a predetermined level, the spring 152 drives the disabling piston 142 to the right, viewing FIG. 2, thereby driving extension 154 into engagement with movable member 136, and also thereby driving the exhaust valve member 128 and valve member 126 to the right, viewing the Figure, out of the range of movement of the primary portioning portion 102 so that the valve seat 124 cannot engage the valve member 126 into proportion communication with section 78. Accordingly, the proportioning section 72 has been disabled, so that communication is substantially uninhibited between the service port 24 and the section 78, so that the pressure level in section 78 will be substantially equal to that at the service port 24.

Figure 4:
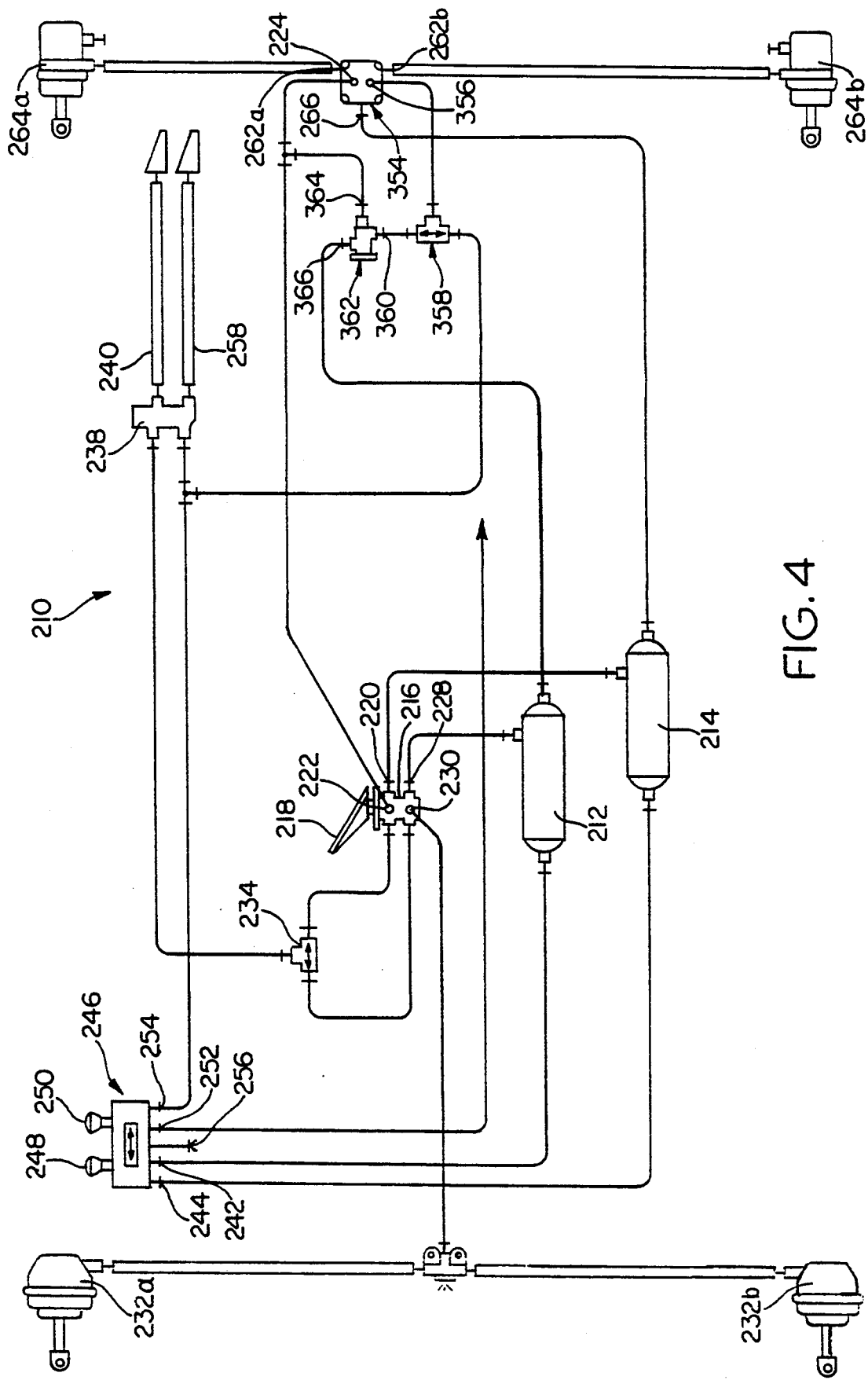
FIG. 4 is a schematic illustration of a fluid pressure braking system made according to a first alternate embodiment of the present invention.

Referring now to the alternate embodiment of FIG. 4, elements substantially the same as those in preferred embodiment retain the same reference numeral, but are increased by 200. In FIG. 4, the proportioning relay valve 354 is identical to the proportioning relay valve disclosed in the aforementioned prior art U.S. Pat. Nos. 4,725,101 or 4,850,651, and differs from the valve illustrated in FIG. 2 hereof in that the disabling piston 142 is eliminated and the exhaust valve member 128 is fixed to the housing 68, instead of being mounted on a movable member. As illustrated in FIG. 4, the supply port 266 of the valve 354 is connected to the rear axle service reservoir 214 and the delivery ports 262a, 262b are connected to the actuators 264a, 264b. The control port 356 however, is connected to a double check valve 358. One side of the double check valve 358 is connected to the supply line 258, and the other side of the double check valve 358 is connected to the delivery port 360 of a conventional inversion valve 362. The supply port 364 of inversion valve 362 is connected between the service port 224 of the proportioning relay valve 354 and the outlet port 220 of the brake valve 216. The control port 366 of inversion valve 362 is communicated to the front axle reservoir 212. The inversion valve 362 is conventional, and as is well known in the art, the inversion valve 362 responds to a decrease in pressure at control port 366 to connect supply port 364 with delivery port 360. If the pressure at control port 366 drops below a predetermined level, the supply port 364 is connected to the delivery port 360. Accordingly, since the delivery port 360 and the supply line 258 are connected to the control port 356, a pressure signal will be delivered to control port 356, thereby disabling the proportioning valve assembly 104 either when the supply line is pressurized, thereby indicating that a trailer is being pulled by the tractor in which it is desirable to disable the proportioning feature of the proportioning relay valve, or when the pressure in secondary reservoir 212 drops below the predetermined level thereby opening the inversion valve 362 to communicate a pressure signal to control port 356 when a brake application is effected by the vehicle operator. Accordingly, the proportioning valve assembly 104 is also disabled during a failure in the front axle braking circuit.

Figure 5:
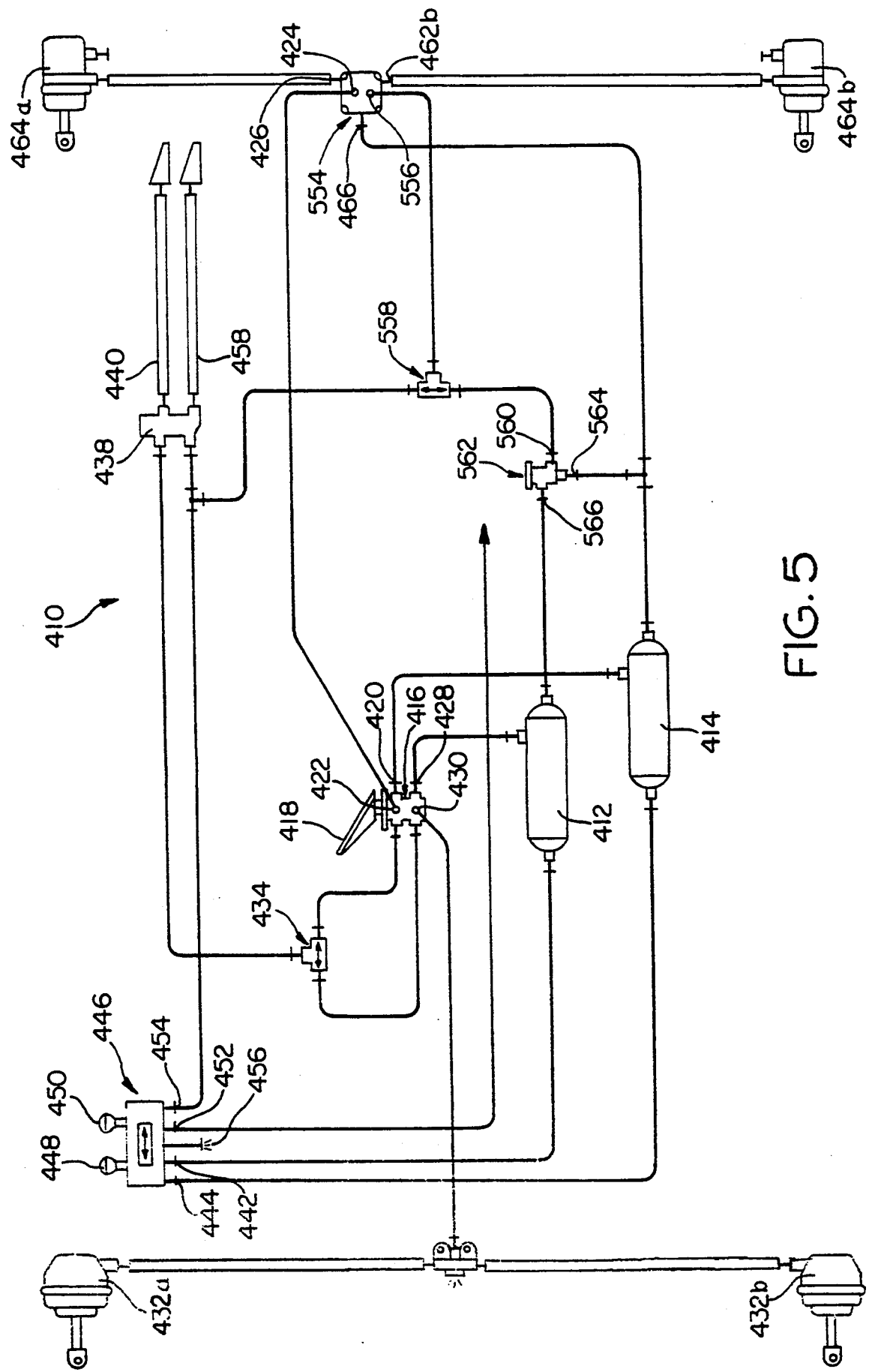
FIG. 5 is a schematic illustration of a fluid pressure braking system made according to a second alternate embodiment of the present invention.

Referring now to the alternate embodiment of FIG. 5, elements substantially the same as those in the embodiment of FIG. 4 retain the same references numeral, but are increased by 200. In the embodiment of FIG. 5, the control port 566 of the inversion valve 562 is connected to the secondary reservoir 412 as in the embodiment of FIG. 4, but the supply port 564 is connected between the reservoir 414 and the supply port 466 of the proportioning relay valve 554. The delivery port 560 is connected through the double check valve 558, the other side of which is connected to the supply line 458. Accordingly, if the pressure in the front axle surface drops below a predetermined value, the inversion valve 562 opens, thereby communicating supply port 564 which is connected to reservoir 414 to the delivery port 560 thereof. Accordingly, a pressure signal is communicated through the double check valve 558 to the control port 556, thereby disabling the proportioning assembly 104 to assure the proportioning will not occur in the case of a failed front axle circuit including reservoir 412.

I claim:

1. Fluid pressure braking system for a tractor-trailer combination vehicle comprising a tractor braking system, a trailer braking systems, and a pressure line communicating the tractor braking system with the trailer braking system, said tractor braking system including separate front wheel and rear wheel braking circuits, an operator-actuated brake valve for simultaneously providing service brake application effecting signals to establish a corresponding pressure level in said braking circuits, a relay valve responsive to the service brake application effecting signal provided by said operator-actuated brake valve for effecting a service brake application in said rear wheel braking circuit, said relay valve including proportioning means responsive to a predetermined pressure condition in said pressure line for establishing a proportioned fluid pressure level in said rear wheel braking circuit upon generation of said brake application effecting signal in the rear wheel braking circuit, and disabling means for disabling said proportioning means, means for communicating the pressure level in said front wheel braking circuit to said disabling means said disabling means being responsive to a decrease in the pressure level in the front wheel braking circuit below a predetermined level to disable said proportioning means to thereby assure that full braking pressure is communicated in the rear wheel braking circuit when the pressure level in the front wheel braking circuit is below the predetermined level.

2. Fluid pressure braking system as claimed in claim 1, wherein said disabling means includes a pressure responsive disabling piston responsive to the pressure level in the front wheel braking circuit for disabling said proportioning means.

3. Fluid pressure braking system as claimed in claim 2, wherein said relay valve includes a housing having a supply port, a service port, a delivery port, and valve elements for controlling communication between the supply and delivery ports as a function of the brake application effecting signal communicated to the service port, said proportioning means being located in the flow path between the service port and the valve elements, said disabling piston being slidable in response to said pressure level in the front wheel braking circuit to a position within said housing disabling said proportioning means.

4. Fluid pressure braking system as claimed in claim 3, wherein said proportioning means includes a proportioning piston and an inlet valve cooperating with said proportioning piston to control communication through said flow path when said proportioning means is operative, said disabling piston holding said inlet valve open in response to said pressure level in the front wheel braking circuit dropping below a predetermined level.

5. Fluid pressure braking system as claimed in claim 4, wherein said inlet valve cooperates with an exhaust seat to control communication through said flow path, said exhaust seat being mounted on a movable member slidable within said housing in response to movement of the disabling piston.

6. Fluid pressure braking system as claimed in claim 5, wherein said housing includes a fixed stop, said movable member being urged into engagement with said stop when said pressure level in the front wheel braking circuit is above the predetermined level.

7. Fluid pressure braking system as claimed in claim 5, wherein a spring urges said disabling piston to a position holding said inlet valve open, said spring being opposed by the pressure level in the front wheel braking circuit acting against said disabling piston.

8. Fluid pressure braking system as claimed in claim 5, wherein said proportioning piston includes primary and secondary portions, said primary portion cooperating with said inlet valve to proportion communication through said flow path, said secondary portion being responsive to fluid pressure at said supply port to change the pressure ratio across the proportioning valve in response to change of pressure at the supply port, said exhaust seat, said disabling piston, and said primary and secondary portions having a common axis to permit the disabling piston to move the exhaust seat and the inlet valve to a disabling position with respect to the primary portion.

9. Fluid pressure braking system as claimed in claim 8, wherein said proportioning piston cooperates with said inlet valve to proportion communication through said flow path, said exhaust seat, said disabling piston, and said proportioning piston having a common axis to permit the disabling piston to move the exhaust seat and the inlet valve to a disabling position with respect to the primary portion.

10. Fluid pressure braking system as claimed in claim 1, wherein said disabling means includes pneumatic control valves.

11. Fluid pressure braking system as claimed in claim 10, wherein said relay valve includes a control port, said pneumatic control valves including an inversion valve that generates an output pressure signal when the pressure level in the front wheel braking circuit is below the predetermined level, and means selecting the higher of the pressure level in the pressure line or the output pressure signal for communication to said control port, said proportioning means being responsive to the pressure at the control port to disable said proportioning means.

12. Fluid pressure braking system as claimed in claim 11, wherein said inversion valve includes a service port communicated to said brake valve, said inversion valve including a supply port communicated to said service port, a control port communicated to the pressure level in the front wheel braking circuit, and a delivery port communicated to said control port.

13. Fluid pressure braking system as claimed in claim 11, wherein said inversion valve includes a service port communicated to the pressure level in the rear wheel braking circuit, a control port communicated to the pressure level in the front wheel braking circuit, and a delivery port communicated to the control port.

14. Fluid pressure braking system as claimed in claim 1, wherein said relay valve includes a housing having a supply port, a service port, a delivery port, and valve components for controlling communication between the supply and delivery ports as a function of the brake application effecting signal communicated to the service port, said proportioning means being located in the flow path between the service port and the valve components and being responsive to the fluid pressure level at the control port to either proportion the pressure level at the valve components as a proportion of the pressure level at the service port or to disable said proportioning means, said disabling means also disabling said proportioning means as a function of the pressure level in the front wheel braking circuit.

15. Fluid pressure braking system as claimed in claim 14, wherein said disabling means includes pneumatic control valves responsive no the pressure level in said front wheel braking circuit for communicating a pressure signal to the control port when the pressure level in the front wheel braking circuit drops below a predetermined level.

16. Fluid pressure braking system as claimed in claim 14, wherein said disabling means includes a pressure responsive disabling piston slidably mounted within the relay valve and cooperating with the proportioning means, said relay valve further including a signal receiving port communicated with the pressure level in the front wheel braking circuit, said disabling piston being responsive to the pressure level at the signal receiving port to disable said proportioning means when the pressure level in the front wheel braking circuit drops below a predetermined level.

* * * * *